United States Patent [19]

Horie et al.

[11] Patent Number: 5,016,550
[45] Date of Patent: May 21, 1991

[54] SEWING MACHINE FOR STITCHING SELECTED PATTERNS

[75] Inventors: Fujio Horie, Nagoya; Kenji Matsubara, Aichi, both of Japan

[73] Assignee: Brother Kogyo Kabushiki Kaisha, Nagoya, Japan

[21] Appl. No.: 553,452

[22] Filed: Jul. 17, 1990

[30] Foreign Application Priority Data

Jul. 28, 1989 [JP] Japan .................................. 1-197525

[51] Int. Cl.⁵ .............................................. D05B 3/02
[52] U.S. Cl. ..................................... 112/454; 112/458
[58] Field of Search ............... 112/454, 458, 453, 457, 112/121.12, 121.11, 445; 364/470

[56] References Cited

U.S. PATENT DOCUMENTS

| | | | |
|---|---|---|---|
| 4,122,786 | 10/1978 | Tanimoto et al. | 112/454 |
| 4,557,207 | 12/1985 | Turner et al. | 112/454 X |
| 4,688,498 | 8/1987 | Carlson | 112/103 |
| 4,688,503 | 8/1987 | Kato | 112/454 X |

Primary Examiner—Peter Nerbun
Attorney, Agent, or Firm—Oliff & Berridge

[57] ABSTRACT

In the sewing machine of this invention, the operator can confirm on the selected-mode display M9 provided in the display M4 that the selected mode is for writing the pattern and whether the selected pattern is for only one use or the selected pattern is to be stored in the nonvolatile storage M7. The pattern selector M2 selects at least two patterns from the pattern-data storage M1. The arrangement of the selected patterns is stored in the pattern storage M3. The stored arrangement of the patterns is stored in the nonvolatile storage M7. Through specified processes, the patterns reader M8 develops the arrangement of the pattern stored in the nonvolatile storage M7 into the pattern storage M3. The controller M6 sequentially reads the arrangement of the patterns developed in the pattern storage M3 and drives the sewing mechanism M5 to form the arrangement of the patterns on fabric. When the pattern to be used repeatedly is thus once entered, the pattern can repeatedly be stitched on fabric.

18 Claims, 10 Drawing Sheets

SEWING MACHINE FOR STITCHING SELECTED PATTERNS

BACKGROUND OF THE INVENTION

This invention relates to a sewing machine, particularly to a sewing machine in which at least one pattern is selected from a storage apparatus storing multiple patterns, the arrangement of at least two selected patterns is stored, the stored arrangement is sequentially read, a sewing mechanism is driven, and the selected pattern is stitched.

A related-art sewing machine can stitch a pattern such as a name of a student or the student's school name on fabric when an operator repeatedly operates numeral keys to select characters by combining the characters to form the names.

In the related-art sewing machine, stitch data for each pattern is stored beforehand in a ROM of a microcomputer provided in the sewing machine so that the sewing mechanism of the sewing machine is driven to stitch the pattern on fabric. When the operator repeatedly enters input numbers with the numeral keys, a pattern number representing the pattern designated by the input number is arranged and stored in a RAM. By reading the pattern numbers sequentially from the RAM, the stitch data corresponding to the pattern numbers is sequentially read from the ROM. Consequently, the sewing mechanism of the sewing machine is driven and the pattern is formed on fabric.

However, in this related-art sewing machine, when a new arrangement of the patterns is designated, the new pattern number is stored in the RAM. Therefore, every time a new pattern is selected, the operator must again operate the numeral keys to enter the arrangement of the patterns into the RAM. The operation of entering the pattern is thus troublesome. For example, when power source is cut, the pattern number stored in the RAM disappears, and the operator must again operate the numeral keys to enter the pattern. Similarly, when the same pattern is formed on fabric many times, the pattern must be entered every time the pattern is formed. The operation of entering the pattern is thus time-consuming.

When the pattern number of the pattern is stored in a nonvolatile memory unit for reuse instead of in volatile RAM in the related-art device, the troublesome input operation is saved should power be cut. However, patterns for only one use are stored in the nonvolatile memory unit.

SUMMARY OF THE INVENTION

One object of this invention is to provide a sewing machine in which, when a patterns for repeated use are entered, whether the arrangement of the patterns is stored in a nonvolatile memory unit can be confirmed on a display. When the patterns are thus entered and stored in a nonvolatile memory unit, the patterns can repeatedly be formed on fabric regardless of the turning on or off of a power source.

Figure 1:
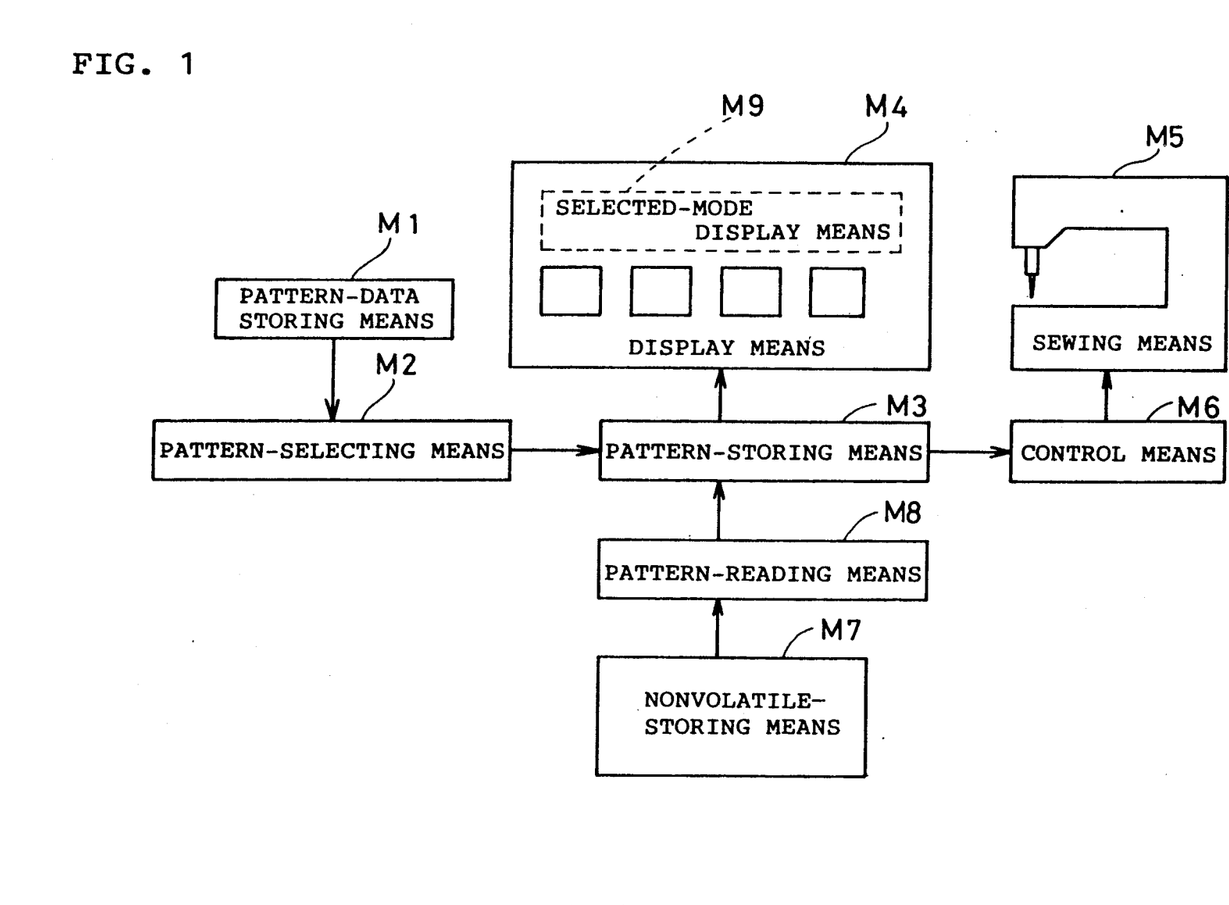
FIG. 1 is a block diagram showing an illustration of the fundamental structure of this invention.

This object is attained by a sewing machine having a structure as shown in FIG. 1. The sewing machine comprises a pattern-data storing means M1 for storing multiple patterns, a pattern-selecting means M2 for selecting at least two patterns from the pattern-data storing means M1, a pattern-storing means M3 for storing the arrangement of the patterns selected by the pattern-selecting means M2, a display means M4 for displaying the arrangement of the patterns stored in the pattern-storing means M3, a sewing means M5, and a control means M6 for sequentially reading the arrangement of the patterns from the pattern-storing means M3, driving the sewing means M5, and forming the pattern. The sewing machine further comprises a nonvolatile-storing means M7 for storing the arrangement of the patterns in nonvolatile condition, and a pattern-reading means M8 for developing the arrangement of the patterns stored in the nonvolatile-storing means M7 into the pattern-storing means M3. The display means M4 comprises a selected-mode display means M9 for displaying that the pattern-selecting means M2 is in a writing mode, when the pattern-selecting means M2 selects the patterns, and when the patterns are written in the nonvolatile-storing means M7.

In the above-constructed sewing machine, the pattern-selecting means M2 selects at least two patterns from the pattern-data storing means M1. The arrangement of the selected patterns is stored in the pattern-storing means M3. The stored arrangement of the patterns in the pattern-storing means M3 can be stored in the nonvolatile-storing means M7. When the pattern-selecting means M2 selects the patterns to be written into the nonvolatile-storing means M7, the selected-mode display means M9 provided in the display means M4 shows that the pattern-selecting means M2 is in the writing mode. The operator confirms with the display of the writing mode whether the selected patterns are for only one use or whether the selected patterns are to be stored in the nonvolatile-storing means M7.

Through specified processes, the pattern-reading means M8 develops the arrangement of the patterns stored in the nonvolatile-storing means M7 into the pattern-storing means M3. The control means M6 sequentially reads the arrangement of the patterns developed in the pattern-storing means M3 and drives the sewing means M5 to form the arrangement of the pattern on fabric.

DETAILED DESCRIPTION OF THE PREFERRED EMBODIMENT

Figure 2:
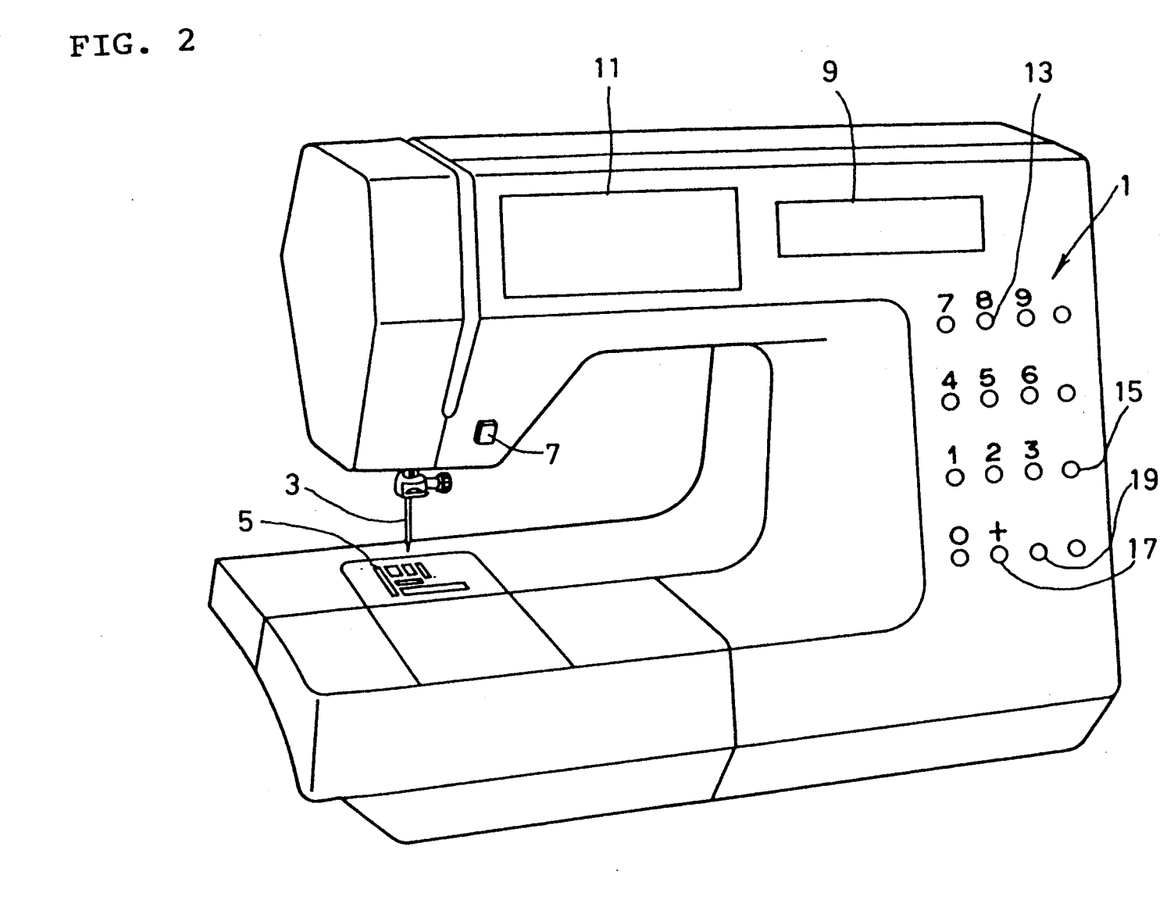
FIG. 2 is an external view of a sewing machine for an embodiment of this invention.

A sewing machine shown in FIG. 2 automatically forms a pattern such as names and other characters in response to instructions entered by means of operation keys 1 and a start switch 7 arranged on the front surface of a casing. The operation keys 1 are used for selecting the pattern. The start switch 7 is provided near a needle 3 and a feed dog 5 and is used for starting the formation of a selected pattern. A display 9 for showing the selected pattern and a reference panel 11 for indicating the selection of patterns to assist the selecting of the pattern.

Figure 3:
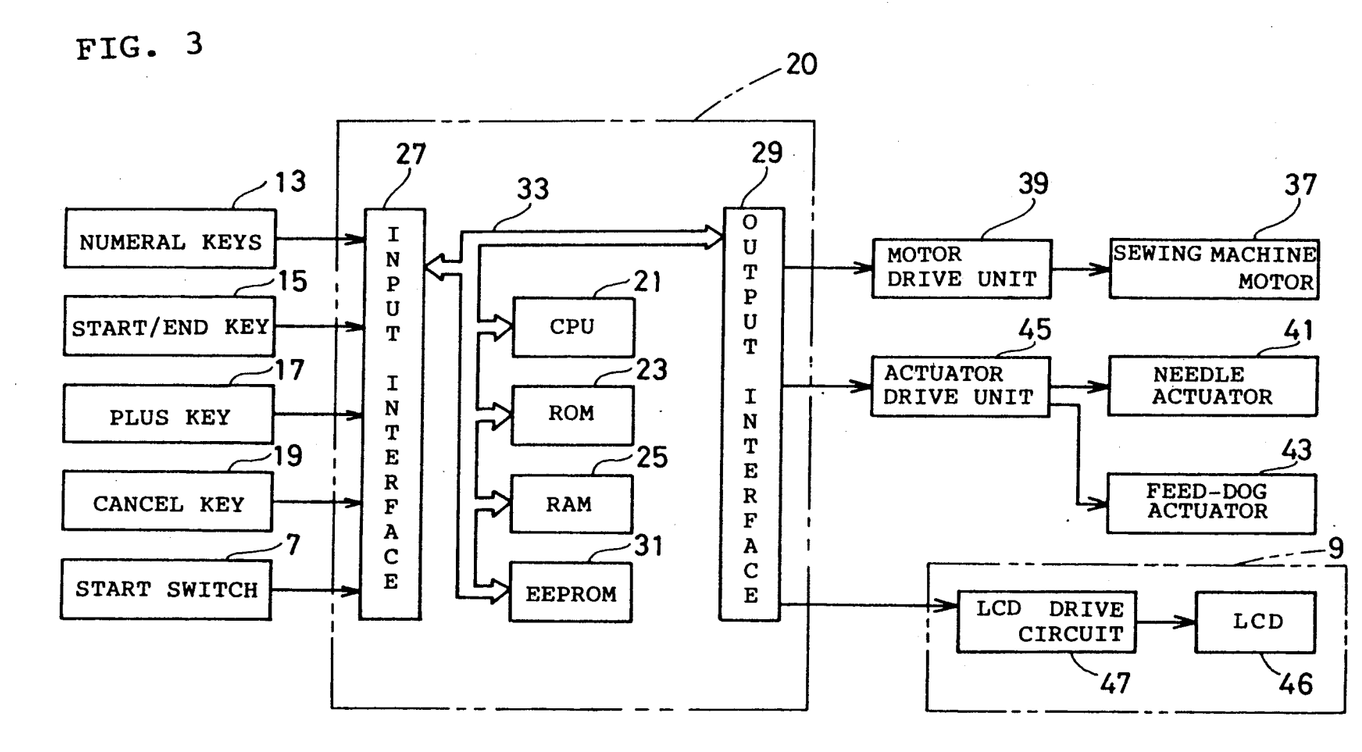
FIG. 3 is a block diagram of an electronic controller for the embodiment of this invention.

The operation keys 1 comprise ten numeral keys 13, a start/end key 15, a plus key 17, and a cancel key 19. The pattern is selected by pressing the numeral keys 13 and entering a two-digit number. By pressing the start/end key 15, the selected pattern is stored. When a combined pattern is selected, the plus key 17 is pressed. The cancel key 19 is pressed for canceling the selected pattern. As shown in FIG. 3, the display 9 comprises an LCD 46. Dot-matrix characters are displayed on the LCD 46 corresponding to the number or the pattern designated with the numeral keys 13 in designating order.

The reference panel 11 show characters, symbols, or other shapes corresponding to the two-digit number entered with the numeral keys 13. In this embodiment, two-digit numbers 01 through 94 correspond to ordinary patterns such as the letters of the alphabet. An operator can combine characters, symbols, and other shapes and store the combined pattern into a nonvolatile memory unit. Two digit numbers 95 through 99 are used when the operator writes and reads the combined pattern. This combined pattern is hereinafter referred to as a message pattern. Reference panel 11 indicates that the two-digit numbers 95 through 99 are for creating message patterns.

In response to the instructions entered as described above, an electronic controller 20 controls the sewing mechanism of the sewing machine.

As shown in FIG. 3, the electronic controller 20 comprises a known CPU 21, ROM 23, RAM 25, input interface 27, output interface 29, and EEPROM 31. The EEPROM is an acronym for Electrically Erasable and Programmable ROM, and another term for EAROM (Electrically Alterable ROM). The EEPROM 31 is used as the nonvolatile storage apparatus and is connected via a bus 33 with the other components of the electronic controller 20. The numeral keys 13, the start/end key 15, the plus key 17, the cancel key 19, and the start switch 7 are connected to the input interface 27. A motor drive unit 39, an actuator drive unit 45, and an LCD drive circuit 47 are connected to the output interface 29. The motor drive unit 39 drives a sewing machine motor 37. The actuator drive unit 45 drives a needle actuator 41 for oscillating the needle 3 and a feed-dog actuator 43 for driving the feed dog 5. The LCD drive circuit 47 drives the LCD 46.

The electronic controller 20 performs a series of operations according to the program stored in the ROM 23. The pattern is selected corresponding to the number entered with the numeral keys 13, and the selected pattern is automatically formed on fabric. The ROM 23, the RAM 25 and the EEPROM 31, respectively, store specified data as follows.

Figure 4A:
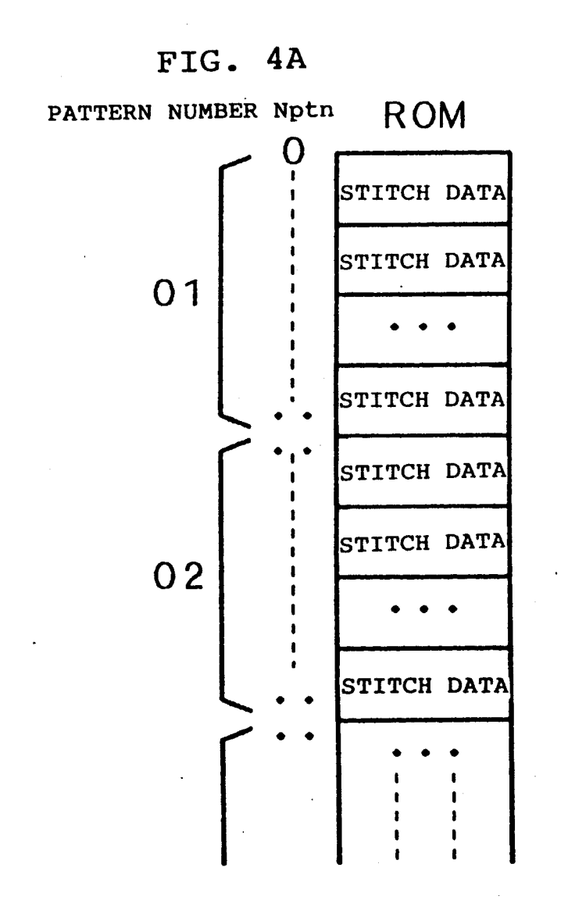
FIGS. 4A, 4B and 4C are diagrams showing data stored in the storage region of a ROM, a RAM and an EEPROM, respectively.

Stitch data for each pattern is stored beforehand in the ROM 23 so that the motor drive unit 39 and the actuator drive unit 45 are driven to form stitches. As shown in FIG. 4A, the stitch data required for forming a character or a symbol is assembled into a set. The set of the stitch data is specified as a pattern having a pattern number Nptn.

Figure 4B:
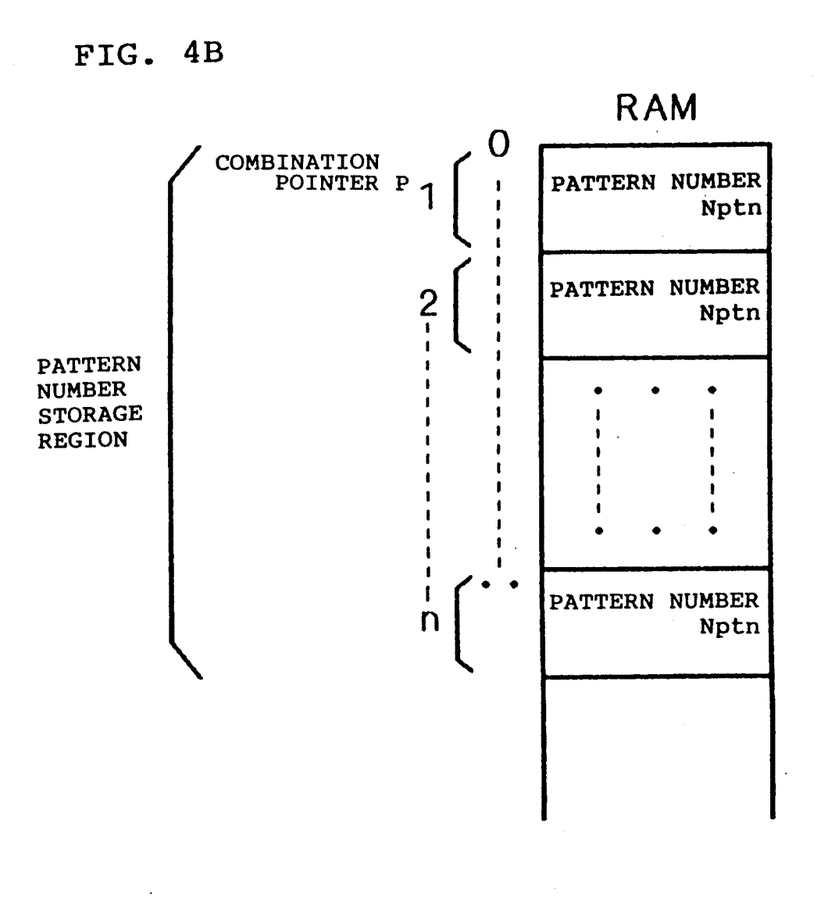

The RAM 25 comprises a pattern number storage region for storing the pattern numbers Nptn. As shown in FIG. 4B the pattern numbers Nptn are arranged and stored. The value of a combination pointer P specifies each pattern number Nptn.

Figure 4C:
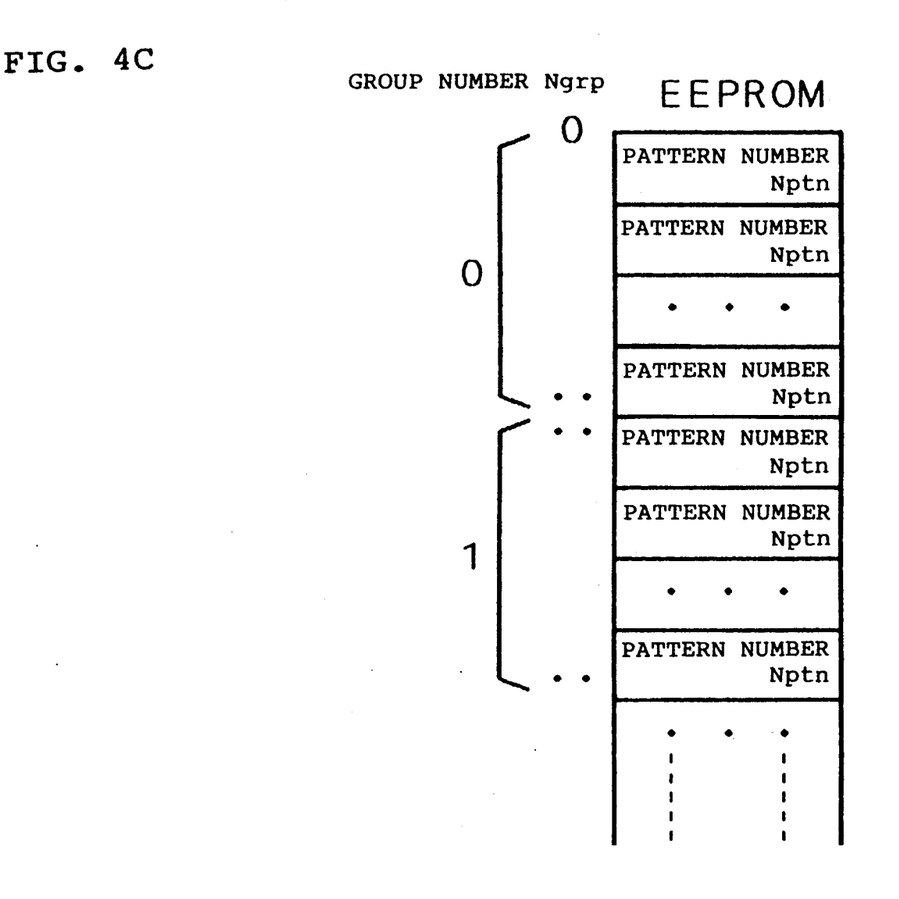

The EEPROM 31 comprises a nonvolatile storage region for storing the arrangement of the pattern numbers Nptn. As shown in FIG. 4C the pattern numbers Nptn are arranged and stored group by group. The groups of the pattern numbers Nptn, respectively, have a specified group number Ngrp. The arrangement of the groups of the pattern numbers Nptn stored in the EEPROM 31 corresponds to the arrangement of the pattern numbers Nptn stored in the RAM 25. In this embodiment, since the group numbers Ngrp are provided from 0 through 4, five groups of the pattern numbers Nptn may be arranged and stored. In the electronic controller 20 the group numbers Ngrp from 0 through 4 correspond, respectively, to the numbers 95 through 99 entered with the numeral keys 13.

The series of operations performed by the electronic controller 20 in response to key operations will now be explained.

Figure 5A:
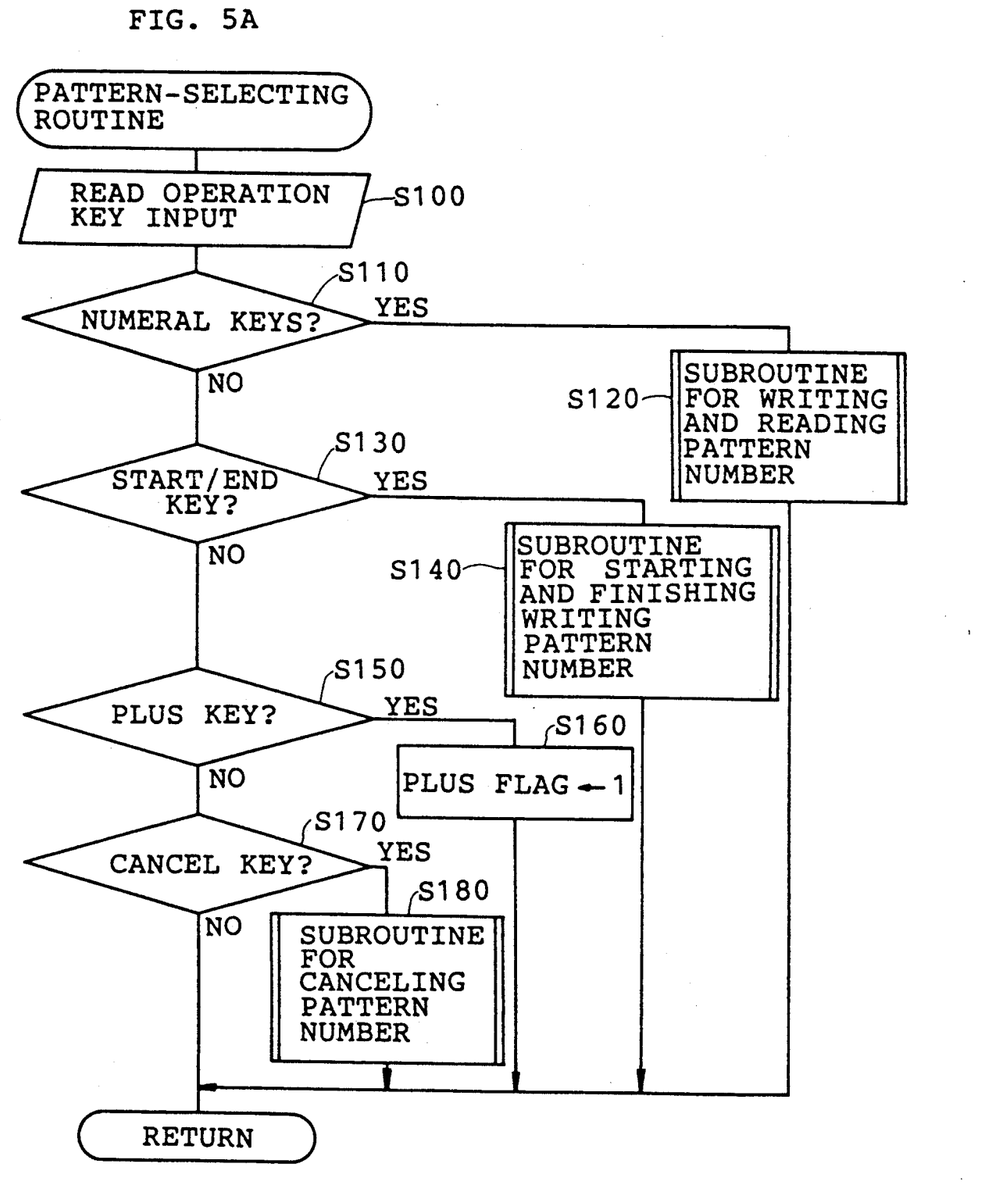
FIGS. 5A, 5B, 5C, 5D and 5E are flowcharts showing an illustration of processes the electronic controller executes.

After a power switch is turned on and initialization is carried out, the electronic controller 20 starts the pattern-selecting routine shown in the flowchart of FIG. 5A. In the pattern-selecting routine, the input of an operation key is first read, and the operation key is identified. By repeating subroutines corresponding to respective functions of the operation keys, the electronic controller 20 controls the sewing machine in response to the instructions given with the operation keys.

At step S100 the input of an operation key is first read, and step S110 determines whether the operation key corresponds to the numeral key 13. When the numeral key 13 is operated, step S120 executes a subroutine for writing and reading the pattern number. In this subroutine the pattern number corresponding to the number entered with the numeral keys 13 is stored in the RAM 25. Alternatively, the pattern number of the pattern related with the message pattern is written into or read from the EEPROM 31.

On the other hand, if at step S110 the numeral key 13 is not operated, step S130 determines whether the start/end key 15 is operated or not. When the start/end key 15 is operated, step S140 executes a subroutine for starting and finishing writing the pattern number into the EEPROM 31. If at step S130 the start/end key 15 is not operated, step S150 determines whether the plus key 17 is operated or not. When the plus key 17 is operated, step S160 sets a plus flag Fpls. The setting of the plus flag Fpls indicates that character inputs and symbol inputs are combined into a pattern. Specifically, the pattern number Nptn written into the RAM 25 or the EEPROM 31 at step S120 is added onto the last stored pattern number Nptn.

When step S150 determines that the plus key 17 is not operated, step S170 determines whether the cancel key 19 is operated or not. When the cancel key 19 is operated, step S180 executes a subroutine for canceling the pattern number written into the RAM 25 or the EEPROM 31 at step S120.

As aforementioned, the electronic controller 20 determines the type of the operation key, repeatedly executes the subroutine corresponding to the function of the operation key, and controls the sewing mechanism of the sewing machine according to the instructions given by the operator.

Types of the operation executed by the electronic controller 20 will now be explained.

OPERATION A

When a certain pattern needs to be formed once, the electronic controller 20 executes a process as follows. For the following process, the numeral keys 13 are operated in combination with the plus key 17.

When the operator presses the numeral keys 13, step S110 determines that the numeral keys 13 operate, and the process goes to step S120, which executes the subroutine for writing and reading the pattern number.

Figure 5B:
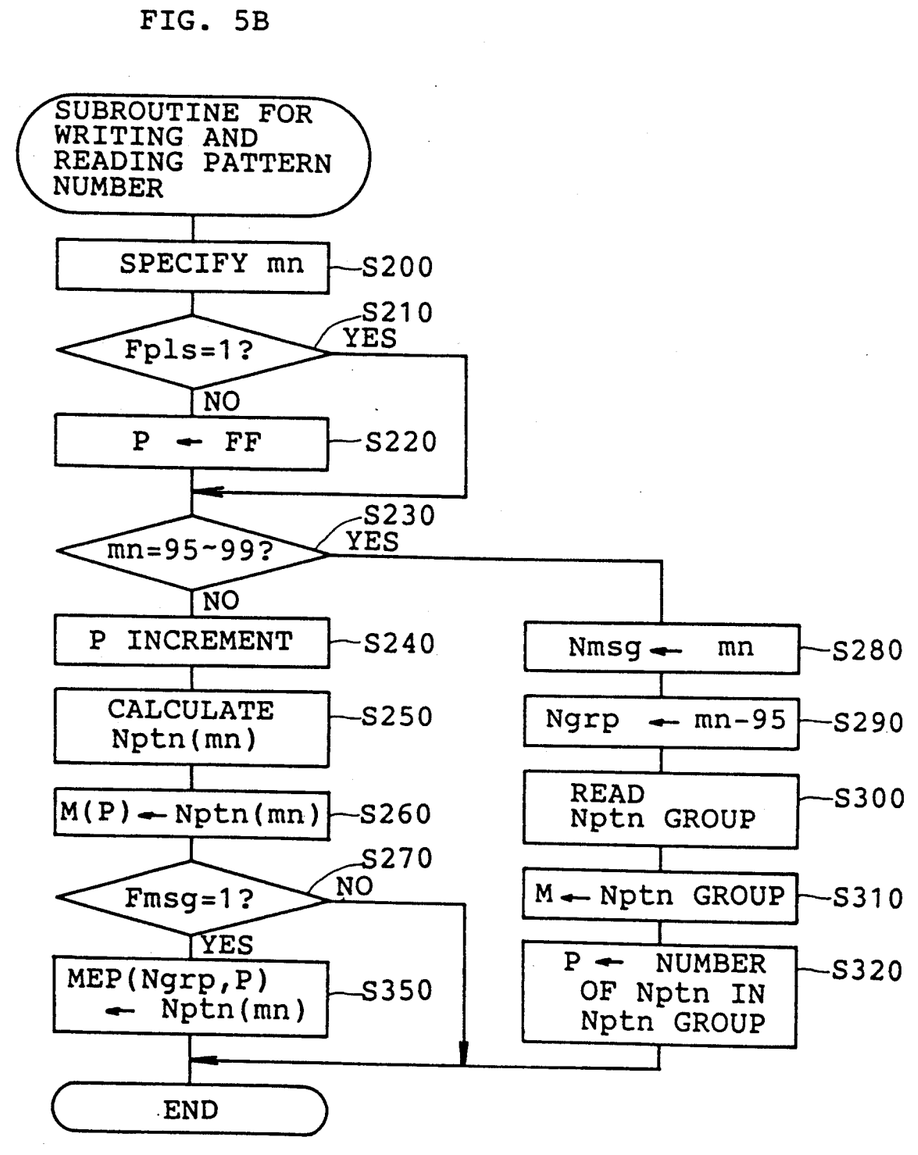

As shown in the flowchart of FIG. 5B, in this subroutine step S200 specifies a two-digit input number mn entered with the numeral keys 13.

Subsequently, step S210 determines whether the plus flag Fpls is set to one or not. Since the pattern is the first pattern entered with the numeral keys 13, the plus flag Fpls has not yet been set. Therefore, the answer at step S210 is negative, and the process goes to step S220 at which the combination pointer P is reset to a value FF. The combination pointer P designates the combining sequence of the pattern number Nptn of the pattern corresponding to the input number mn.

Subsequently, step S230 determines whether the input number mn corresponds to a number from 95 through 99. Specifically, step 230 determines whether the process is related to message pattern. Since the arrangement of the patterns required once is entered in this type of operation, the input number mn entered with the numeral keys 13 is other than from 95 through 99. Therefore, the answer at step S230 is negative.

Subsequently, step S240 increments the combination pointer P, and step S250 calculates the number Nptn(mn) of the pattern corresponding to the input number mn. Such specifying of the pattern number Nptn determines the set of stitch data stored in the ROM 23 that is required for forming the pattern corresponding to the input number mn.

After the calculated pattern number Nptn(mn) is obtained at step S250, at step S260 the calculated pattern number Nptn(mn) is stored into a memory unit M(P) at the address specified by the value of the combination pointer P in the pattern number storage region of the RAM 25.

Subsequently, step S270 determines whether a message flag Fmsg is set to one. The message flag Fmsg is usually set or reset with the start/end key 15 at step S140. Since the arrangement of the patterns required once is entered for this type of the operation, the message flag Fmsg is reset. The answer at step S270 is, therefore, negative. The subroutine for writing and reading the pattern number at step S120 thus ends.

Figure 6A:
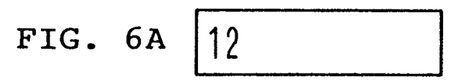
FIGS. 6A, 6B, 6C, 6D, 6E, 6F, 6G, 6H and 6I are explanatory diagrams showing the display shown at each process.
Figure 6B:
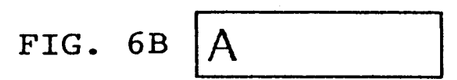

As aforementioned, the pattern number Nptn of the pattern entered with the numeral keys 13 is stored in the RAM 25. On the other hand, the electronic controller 20 performs separate processes to display the pattern number Nptn stored in the RAM 25 on the display 9 so that the operator can confirm the pattern number Nptn on the display 9. As illustrated in FIG. 6A, the display 9 first shows the input number mn entered with the numeral keys 13 for several seconds. Subsequently, as illustrated in FIG. 6B, the outline of the pattern corresponding to the input number mn is shown on the display 9.

Figure 6C:
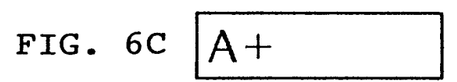

When the plus key 17 is pressed, the electronic controller 20 sets the plus flag Fpls to one at step S160. The electronic controller 20 executes separate processes to show the symbol of plus subsequent to the outline of the pattern as illustrated in FIG. 6C.

Subsequently, when the numeral keys 13 are operated, the electronic controller 20 again executes the subroutine for writing and reading the pattern number in FIG. 5B. Step S210 determines that the plus flag Fpls is set to one, thereby skipping step S220 for resetting the combination pointer P. Since the input number mn is other than from 95 through 99, the answer at step S230 is negative. Step S240 increments the combination pointer P and step S250 calculates the pattern number Nptn(mn) from the input number mn.

Subsequently, at step S260 the calculated pattern number Nptn(mn) is stored into the memory unit M(P) at the address specified by the increased value of combination pointer P in the pattern number storage region of the RAM 25. The calculated pattern number Nptn(mn) is thus stored subsequently to the last stored pattern number. Since the message flag Fmsg is reset to zero, the answer at step S270 is negative. The subroutine thus ends.

When the operator enters the number with the numeral keys 13 and repeatedly presses the plus key 17, the electronic controller 20 repeats the aforementioned subroutine and stores the pattern number Nptn into the RAM 25 in input order as shown in FIG. 4B.

Figure 6D:
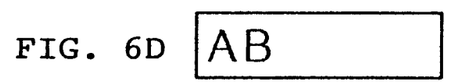

The electronic controller 20 executes separate processes to show the outline of the second entered pattern instead of the symbol of plus on the display 9 as illustrated in FIG. 6D.

Subsequently, when the operator presses the start switch 7, the electronic controller 20 finishes the aforementioned pattern-selecting routine and starts a pattern-forming routine. In the pattern-forming routine, the pattern numbers Nptn, which are arranged and stored in each memory unit M of the pattern number storage region in the RAM 25, are read in order from the smallest value of the combination pointer P. The set of the stitch data corresponding to the read pattern numbers Nptn is read from the ROM 23. The sewing mechanism of the sewing machine is driven, thereby forming the input pattern in input order.

OPERATION B

The operation of the electronic controller 20 for storing the message pattern will now be explained. To store the message pattern, the operator operates the start/end key 15 in addition to the numeral keys 13 and the plus key 17.

First, a number indicating that the message pattern to be stored is selected from 95 through 99 and entered with the numeral keys 13.

When the selected number is entered, the electronic controller 20 shifts its processes to those for the subroutine for writing and reading pattern number shown in FIG. 5B. Step S230 determines whether the input number mn corresponds to a number from 95 through 99.

Subsequently, at step S280 the input number mn is determined as a message number Nmsg. At step S290 value mn-95 is calculated as the group number Ngrp to be stored in the EEPROM 31 by subtracting 95 from the input number mn.

After the group number Ngrp is obtained, at step S300 the group of the pattern numbers Nptn specified and stored by the group number Ngrp in the storage region of the EEPROM 31 is read.

Subsequently, at step S310 the read group of pattern numbers Nptn is copied into each memory unit M of the pattern number storage region in the RAM 25. At step S320 the number of the pattern numbers Nptn composing the read group is registered as the value of the combination pointer P, and the process once ends.

When the processes at steps S280 through S320 result in nothing stored in the EEPROM 31, no pattern numbers Nptn are copied into the RAM 25, and the value of the combination pointer P resets to the value FF at step S220.

Figure 6E:
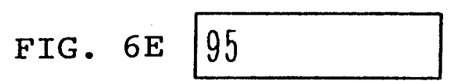

When a number from 95 through 99 is entered with the numeral keys 13, the process for determining the message number Nmsg and other processes are executed as aforementioned. On the other hand, the electronic controller 20 shows the message number Nmsg on the display 9 as illustrated in FIG. 6E, which indicates that the operation processes are in the mode related with the message pattern.

Subsequently, when the start/end key 15 is pressed, the electronic control unit 20 shifts its processes to those for the subroutine for starting and finishing writing the pattern number at step S140.

Figure 5C:
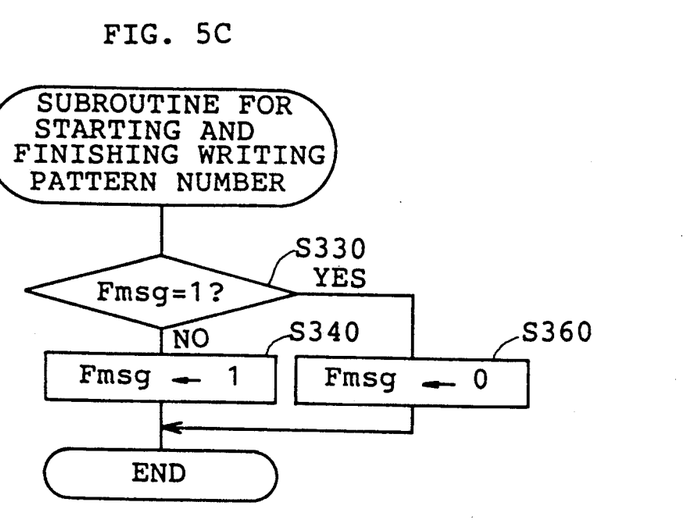

In this subroutine, as shown in FIG. 5C, step S330 determines whether the message flag Fmsg is set to one or not. When a number from 95 through 99 is entered with the numeral keys 13, the message flag Fmsg is not set to one. Therefore, the answer at step S330 is negative, and the message pattern can be stored. At step S340 the message flag Fmsg is set to one.

Figure 5D:
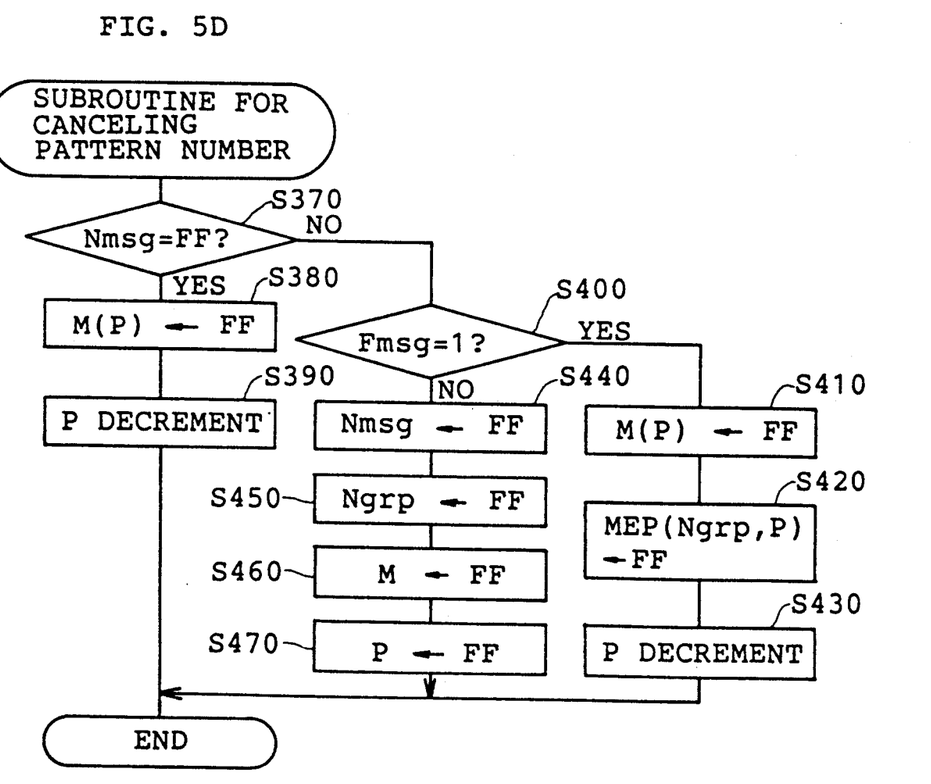
Figure 5E:
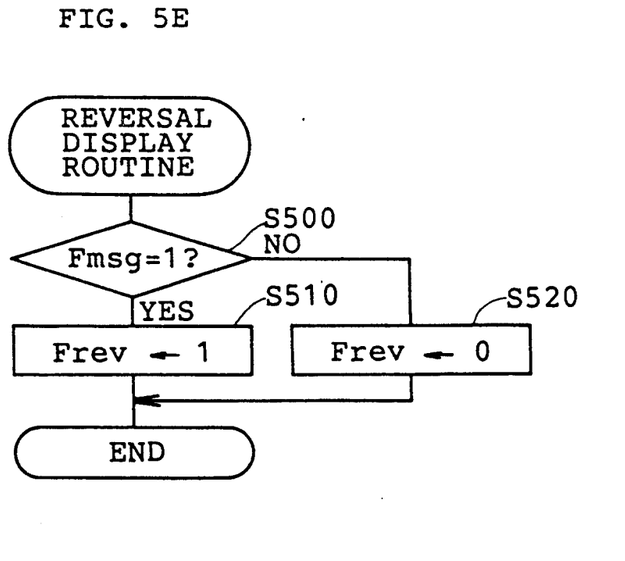
Figure 6F:
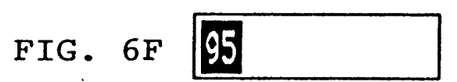

While the electronic controller 20 carries out the above-mentioned subroutine, the electronic controller 20 repeatedly executes a reversal display routine shown in the flowchart of FIG. 5E. First, step S500 determines whether the message flag Fmsg is set to one or not. After the start/end key 15 is pressed, the message flag Fmsg is set to one. Step S510 sets a flag Frev to one for reversing the display of the message number Nmsg on the display 9, and the process ends. When the flag Frev is thus set to one, the electronic controller 20 executes a not-shown process, thereby reversing the display of the message number Nmsg on the display 9 as illustrated in FIG. 6F.

As aforementioned, when any number from 95 through 99 is entered by pressing the number keys 13 and the start/end key 15, the display of the message number Nmsg is reversed. The reversed display of the message number Nmsg indicates that the present-selected mode is for writing the pattern number Nptn of the selected pattern into the EEPROM 31. In the same way as explained in OPERATION A, the numeral keys 13 and the plus key 17 are alternately operated, and the pattern number Nptn corresponding to the input number mn is stored into the RAM 25 and the EEPROM 31 in input order.

Specifically, the electronic controller 20 executes the subroutine for writing and reading the pattern number as shown in the flowchart of FIG. 5B. At step S260 the calculated pattern number Nptn(mn) corresponding to the input number mn entered with the numeral keys 13 is stored in the memory unit M(P) at the address specified by the combination pointer P in the pattern number storage region in the RAM 25. Step S270 then determines whether the message flag Fmsg is set to one. Subsequently, at step S350 the same pattern number Nptn(mn) as the one stored into the RAM 25 at step S260 is written into a nonvolatile memory unit MEP(Ngrp,P) at an address specified by the group number Ngrp and the combination pointer P in the EEPROM 31.

Figure 6G:
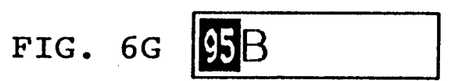

The electronic controller 20 executes a separate process and shows on the display 9, as illustrated in FIG. 6G, the outline of the pattern corresponding to the input number mn subsequently to the reversed display of the message number Nmsg.

The routine for writing and reading the pattern number thus ends. When the plus key 17 is further pressed and the numeral keys 13 are pressed to enter the input number mn, the calculated pattern number Nptn(mn) corresponding to the input number mn is stored into the memory unit M(P) at the address specified by the increased value of the combination pointer P in the RAM 25. At step S350 the same pattern number Nptn(mn) is written into the nonvolatile memory unit MEP(Ngrp,P) at the address specified by the group number Ngrp and the increased value of the combination pointer P in the EEPROM 31.

Through the aforementioned processes, the pattern number Nptn is stored into the RAM 25 and the EEPROM 31 in input order.

Figure 6H:
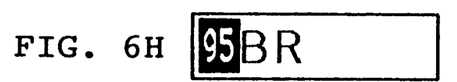

On the other hand, the electronic controller 20 executes separate processes to show the outline of the second entered pattern on the display 9. As illustrated in FIG. 6H the second entered pattern is subsequent to the reversed display of the message number Nmsg and the first entered pattern on the display 9.

When the start/end key 15 is pressed again, the subroutine for starting and finishing writing the pattern number in FIG. 5C starts. Since the message pattern has been stored, step S330 determines that the message flag Fmsg is set to one. Subsequently, at step S360 the message flag Fmsg is reset to zero, thereby finishing writing the pattern number.

Figure 6I:
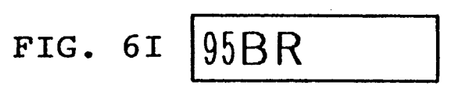

After the message pattern has been stored, the electronic controller 20 executes the reversal display routine as shown in the flowchart of FIG. 5E. First, it is determined at step S500 that the message flag Fmsg is not set to one. At step S520 the reversal display flag Frev resets to zero. The electronic controller 20 executes the display routine not shown, and switches the reversal display to the ordinal display of the message number Nmsg, as illustrated in FIG. 6I.

As aforementioned, the operator enters either number from 95 through 99 with the numeral keys 13, and presses the start/end key 15. On the other hand, the operator can confirm that the reversal display of the message number Nmsg is shown on the display 9 and that the selected mode is for writing the selected pattern number Nptn in the EEPROM 31. The operation of the numeral keys 13 and the plus key 17 is thus repeated. Every time the number is entered with the numeral keys 13, as shown in FIG. 4C, the pattern number Nptn is written into the EEPROM 31, the region of the group number Ngrp first selected by entering either number from 95 through 99 with the numeral keys 13. When the start/end key 15 is pressed at last, the processes for writing the message pattern end.

OPERATION C

To stitch the message pattern registered through the processes of OPERATION B on fabric, the electronic controller 20 carries out the following processes.

When either number from 95 through 99 is entered with the numeral keys 13 for the group number Ngrp at which the desired message pattern is registered, the electronic controller 20 starts the subroutine for writing and reading the pattern number Ngrp in FIG. 5B.

It is determined at step S230 that the input number mn corresponds to either number from 95 through 99.

Subsequently, at step S280 the input number mn is set as the message number Nmsg, and at step S290 the value mn-95 is calculated as the group number Ngrp in the EEPROM 31 by subtracting 95 from the input number mn.

After the group number Ngrp is obtained, at step S300 the group of the pattern numbers Nptn is read from the address specified by the group number Ngrp in the EEPROM 31.

At step S310, the group of the pattern numbers Nptn read at step S300 is copied into each memory unit M of the pattern number storage region in the RAM 25. The respective pattern numbers Nptn in reading order are stored into the memory unit M(P) specified by the combination pointer P in the RAM 25 in order from the smallest value of the combination pointer P.

At step S320 the number of the pattern numbers Nptn in the group read at step S300 is registered as the value of the combination pointer P, and the process ends.

In the same way as the processes for storing the message pattern, the electronic controller 20 executes the processes for displaying the message pattern. As illustrated in FIG. 6I, the display 9 shows in sequence any message number Nmsg from 95 through 99 and the outlines of the patterns corresponding to the arrangement of the pattern numbers Nptn stored in the group number Ngrp specified by the message number Nmsg in the EEPROM 31. Since the pattern number Nmsg of the message pattern has been written, the display of the message number Nmsg is not reversed. Consequently, it is confirmed on the display 9 that the selected mode is related to the message pattern, but the mode is not for writing the pattern number Nmsg.

When the start switch 7 is pressed, the electronic controller 20 starts separate processes for stitching the selected pattern. The pattern number Nptn developed in the pattern number storage region of the RAM 25 is read in order from the smallest value of the combination pointer P. The set of the stitch data corresponding to the read pattern number Nptn is read from the ROM 23. By driving the sewing mechanism of the sewing machine, the message pattern selected with the numeral keys 13 is formed.

OPERATION D

The operation for correcting the input with the numeral keys 13 will now be explained. When the operator presses the cancel key 19, the electronic controller 20 executes the process of this operation.

When the operator presses the cancel key 19, the electronic controller 20 executes the subroutine for canceling the pattern number as shown in the flowchart of FIG. 5D. First, it is determined at step S370 whether the message number Nmsg corresponds to the value FF.

When it is determined at step S370 that the message number Nmsg corresponds to the value FF, the electronic controller 20 is in the condition as explained in OPERATION A. Specifically, the selected mode is not for writing or reading the message pattern. Therefore, at step S380 the memory unit M(P) at the address specified by the combination pointer P in the pattern number storage region of the RAM 25 is cleared away. Subsequently, step S390 executes the process for the decrement of the combination point P, and the process ends. Through these processes only the last stored pattern number Nptn is deleted from the RAM 25, and the process returns to the condition before the pattern number Nptn is stored.

On the other hand, if step S370 determines that the message number Nmsg does not correspond to the value FF, step S400 determines whether the message flag Fmsg is set to one or not.

When step S400 determines that the message flag Fmsg is set to one, the electronic controller 20 is in the condition, as explained in OPERATION B, for writing the message pattern.

Subsequently, at step S410 the memory unit M(P) at the address specified by the value of the combination pointer P in the pattern number storage region of the RAM 25 resets to the value FF. At step S420 the memory unit MEP(Ngrp,P) at the address specified by the group number Ngrp and the combination pointer P in the EEPROM 31 resets to the value FF. After step S430 decrements the combination pointer P, the process ends. Through this process, the last written pattern number Nptn is deleted from the RAM 25 and the EEPROM 31. The process thus returns to the condition before the pattern number Nptn is written into the RAM 25 and the EEPROM 31.

On the other hand, when step S400 determines that the message flag Fmsg is not set to one, for example, the process is in the condition that the message pattern is read with the numeral keys 13 as explained in OPERATION C. After the content of the read message pattern is confirmed, the pattern numbers developed in the RAM 25 are deleted so as to alter all the read message patterns.

Specifically, at step S440 the message number Nmsg is reset to the value FF and at step S450 the group number Ngrp is reset to the value FF. At step S460 each memory unit M in the pattern number storage region of the RAM 25 is reset to the value FF, and at step S470 the combination pointer P is reset to the value FF. Through this process, all the pattern numbers Nptn developed in the pattern number storage region in the RAM 25 are deleted. Even when the pattern numbers Nptn are deleted from the RAM 25, no arrangement of the pattern numbers Nptn is deleted from the EEPROM 31.

As aforementioned, when the sewing machine of this embodiment is operated, the reversal display of the message number Nmsg on the display 9 can be confirmed. When the pattern is selected with the numeral keys 13, the pattern number Nptn is stored in the EEPROM 31. The pattern number Nptn stored in the EEPROM 31 is copied into the RAM 25 to form the arrangement of the patterns. For example, a name can be stored for reuse as a message pattern in the EEPROM 31. By reading the name with the numeral keys 13, the stored name can be repeatedly stitched on the fabric. The selected pattern can thus easily be entered.

When the message number Nmsg is shown on the display 9, it is determined that the message pattern is entered. On the other hand, when the message for only one use is entered. On the other hand, when the message for only one use is entered, no message number Nmsg is shown on the display 9. When the display of the message number Nmsg is reversed, the mode is for writing the pattern number of the message pattern into the EEPROM 31. When the mode is for reading the pattern number of the message pattern from the EEPROM 31, the ordinary display of the message number Nmsg is shown in the display 9. Consequently, the confirmation of the mode with the display can avoid operational mistakes and facilitate the operation of the sewing machine.

From the above description of a preferred embodiment of the invention, those skilled in the art will perceive improvements, changes, and modifications. Such improvements, changes and modifications within the skill of the art are intended to be covered by the appended claims. For example, the nonvolatile storage apparatus comprises a RAM supported by a battery. In this embodiment every time the pattern is selected, the pattern number is stored. The arrangement of all the selected patterns stored in the RAM 25 can be stored in the nonvolatile storage apparatus. When power source is cut during the operation by mistake, the pattern numbers of all the selected patterns fail to be stored in the nonvolatile memory apparatus. However, since it is shown on the display that the selected mode is for writing the pattern number in this embodiment, such mistake can substantially be avoided and the entered pattern can be prevented from becoming invalid.

What is claimed is:

1. A sewing machine comprising:
   sewing means for forming stitches under control of pattern data;
   pattern-data storing means for storing pattern data;
   pattern-storing means for storing at least two patterns in a sewing order as a selected pattern arrangement;
   nonvolatile-storing means for storing selected pattern arrangements in a nonvolatile condition;
   pattern-selecting means for selecting at least two patterns represented by the pattern data stored in the pattern-data storing means to form a selected pattern arrangement and selectively storing the selected pattern arrangement in the pattern-storing means or the nonvolatile-storing means; and
   control means for selectively sending the pattern data corresponding to the selected pattern arrangement stored in the pattern-storing means or the nonvolatile-storing means to the sewing means such that the sewing means stitches the patterns of the selected pattern arrangement in the sewing order.

2. The sewing machine of claim 1, in which the selected pattern arrangements stored in the nonvolatile-storing means may be erased.

3. The sewing machine of claim 1, in which:
   the pattern-selecting means stores the selected pattern arrangements in the nonvolatile-storing means by first storing selected pattern arrangements in the pattern-storing means and then copying selected pattern arrangements from the pattern-storing means into the nonvolatile-storing means; and
   the control means sends selected pattern arrangements from the nonvolatile-storing means to the sewing means by copying selected pattern arrangements stored in the nonvolatile-storing means into the pattern-storing means and sending copied selected pattern arrangements from the pattern storing means to the sewing means.

4. The sewing machine of claim 1, in which:
   the pattern-selecting means further comprises a first switching means for selectively switching the pattern-selecting means between a first selecting mode in which the selected pattern arrangements are stored in the nonvolatile-storing means and a second-selecting mode in which the selected pattern arrangements are stored in the pattern-storing means; and
   the control means further comprises a second switching means for selectively switching the control means between a first sending mode in which the control means sends the selected pattern arrangements from the nonvolatile-storing means to the sewing means and a second sending mode in which the control means sends the selected pattern arrangements from the pattern storing-means to the sewing means.

5. The sewing machine of claim 4, further comprising display means for indicating whether the first switching means is in the first selecting mode or in the second selecting mode.

6. The sewing machine of claim 5, in which the display means further indicates whether the second switching means is in the first sending mode or the second sending mode.

7. The sewing machine of claim 5, in which the pattern-selecting means further comprises:
   number-selecting means for selecting numbers corresponding to each pattern data stored in the pattern-data storing means;
   plus-entering means for instructing the pattern-selecting means to add a previously selected number to a subsequently selected number; wherein
   a group of patterns are formed into selected pattern arrangements by alternately selecting a number and instructing the pattern-selecting means to add the selected number to the subsequently entered number.

8. The sewing machine of claim 7, further comprising start-indicating means for instructing the control means to send the selected pattern arrangements to the sewing means.

9. The sewing machine of claim 7, in which the display means further displays:
   numbers selected by the number-selecting means;
   patterns corresponding to the numbers selected by the number-selecting means; and
   whether the pattern-selecting means has been instructed to add a previously selected pattern to a subsequently selected pattern.

10. The sewing machine of claim 9, in which the display means first displays a selected number in a given display region and then displays the pattern corresponding to the selected number in the given display region.

11. A sewing machine comprising:
    pattern-data storing means for storing pattern data representing patterns;
    arrangement-storing means for storing an arrangement of patterns, where each arrangement comprises at least two patterns;
    nonvolatile-storing means for storing at least one arrangement in a nonvolatile condition;
    pattern-selecting means for selecting a desired pattern represented by the pattern data stored in the pattern-data storing means and storing the at least two selected patterns in the arrangement storing means in a sewing order;
    arrangement-saving means for selectively copying at least one arrangement from the arrangement-storing means into the nonvolatile-storing means;
    arrangement-reading means for selectively copying an arrangement stored in the nonvolatile-storing means into the arrangement-storing means;
    sewing means for forming stitches under control of pattern data; and control means for reading the arrangement stored in the arrangement-storing means and sending the pattern data corresponding to the patterns of the arrangement stored in the arrangement-storing means from the pattern-data storing means to the sewing means such that the sewing means stitches the patterns of the arrangement stored in the arrangement-storing means in the sewing order.

12. The sewing machine of claim 11, in which the arrangements stored in the nonvolatile-storing means may be erased.

13. The sewing machine of claim 11, further comprising switching means for switching between:
- a first mode in which the pattern-selecting means stores patterns in the arrangement-storing means and the control means sends the arrangement of patterns stored in the arrangement-storing means to the sewing means;
- a second mode in which the pattern-selecting means stores patterns in the arrangement-storing means and the arrangement-saving means copies the patterns stored in the arrangement-storing means into the nonvolatile-storing means; and
- a third mode in which the arrangement-reading means copies an arrangement stored in the nonvolatile-storing means into the arrangement-storing means and the control means sends the arrangement of patterns stored in the arrangement storing means to the sewing means.

14. The sewing machine of claim 13, further comprising display means for indicating whether the switching means is in the first, second, or third mode.

15. The sewing machine of claim 14, in which the pattern-selecting means further comprises:
- number-selecting means for selecting numbers corresponding to each pattern data stored in the pattern-data storing means; and
- plus-entering means for instructing the pattern-selecting means to add a previously selected number to a subsequently selected number; wherein
- a group of patterns are formed into an arrangement by alternately selecting a number and instructing the pattern-selecting means to add the selected number to a subsequently entered number.

16. The sewing machine of claim 15, further comprising start-indicating means for instructing the control means to send arrangements to the sewing means.

17. The sewing machine of claim 16, in which the display means further displays:
- numbers selected by the number-selecting means;
- patterns corresponding to the numbers selected by the number-selecting means; and
- whether the pattern-selecting means has been instructed to add a previously selected pattern to a subsequently selected pattern.

18. The sewing machine of claim 17, in which the display means first displays a selected number in a given display region and then displays the pattern corresponding to the selected number in the given display region.

* * * * *